United States Patent [19]

Covitch et al.

[11] 4,386,987

[45] Jun. 7, 1983

[54] ELECTROLYTIC CELL MEMBRANE/SPE FORMATION BY SOLUTION COATING

[75] Inventors: Michael J. Covitch, Cleveland Heights; Mark F. Smith, Edison; Leo L. Benezra, Mentor, all of Ohio

[73] Assignee: Diamond Shamrock Corporation, Dallas, Tex.

[21] Appl. No.: 277,951

[22] Filed: Jun. 26, 1981

[51] Int. Cl.³ .............................................. B32B 31/14
[52] U.S. Cl. .................................... 156/155; 156/280; 156/308.2; 156/344; 204/98; 204/128; 204/286; 204/290 R; 204/291; 204/294; 204/297 R; 427/243; 427/270; 427/272; 427/407.1; 427/409; 427/430.1; 428/137; 428/306.6; 428/308.4; 429/129; 429/242; 429/245; 429/254
[58] Field of Search ..................... 156/155, 280, 308.2, 156/344; 204/98, 128, 242, 252, 284, 285, 286, 290 R, 291, 294, 297 R; 427/58, 243, 270, 272, 407.1, 409, 430.1; 428/137, 306.6, 308.4; 429/30, 129, 235–237, 245, 249, 254, 242

[56] References Cited

U.S. PATENT DOCUMENTS

| | | | |
|---|---|---|---|
| 3,274,031 | 9/1966 | Majet et al. | 136/120 |
| 3,297,484 | 1/1967 | Niedrach | 136/86 |
| 3,798,063 | 3/1974 | Decraene | 117/230 |
| 3,925,135 | 12/1975 | Grot | 156/213 |
| 4,191,618 | 3/1980 | Coker et al. | 204/98 |
| 4,209,368 | 6/1980 | Coker et al. | 204/98 |
| 4,210,501 | 7/1980 | Dempsey | 204/129 |
| 4,210,511 | 7/1980 | Campbell et al. | 204/256 |
| 4,210,512 | 7/1980 | Lawrence et al. | 204/257 |
| 4,224,121 | 9/1980 | Dempsey et al. | 204/98 |
| 4,299,675 | 10/1981 | Korach | 204/98 |

FOREIGN PATENT DOCUMENTS 2014585A  2/1978  United Kingdom .

Primary Examiner—Robert A. Dawson
Attorney, Agent, or Firm—Woodrow W. Ban

[57] ABSTRACT

A method for forming a membrane upon an electrode from a dispersed, perfluorocarbon copolymer. Perfluorocarbon is dispersed in a solvating medium, a substantial portion, but not necessarily all of the perfluorocarbon being solvated. The dispersion is applied to an electrode and the dispersion medium is removed.

16 Claims, 2 Drawing Figures

ELECTROLYTIC CELL MEMBRANE/SPE FORMATION BY SOLUTION COATING

FIELD OF THE INVENTION

This invention relates to batteries, fuel cells and electrochemical cells, and particularly to separators utilized in such cells. More specifically, this invention relates to solid polymeric electrolyte cell separators, polymeric cell membranes and methods for fabricating and attaching electrodes to such soid polymeric electrolytes and polymeric membranes for use in electrochemical cells.

BACKGROUND OF THE INVENTION

The use of a separator between an anode and cathode in batteries, fuel cells, and electrochemical cells is known. In the past, these separators have been generally porous separators, such as asbestos diaphragms, used to separate reacting chemistry within the cell. Particularly, for example, in diaphragm chlorine generating cells, such a separator functions to restrain back migration of $OH^-$ radicals from a cell compartment containing the cathode to a cell compartment containing the anode. A restriction upon $OH^-$ back migration has been found to significantly decrease current inefficiencies associated with a reaction of the $OH^-$ radical at the anode releasing oxygen.

More recently separators based upon an ion exchange copolymer have found increasing application in batteries, fuel cells, and electrochemical cells. One copolymeric ion exchange material finding particular acceptance in electrochemical cells such as chlorine generation cells has been fluorocarbon vinyl ether copolymers known generally as perfluorocarbons and marketed by E. I. duPont under the name NAFION ®.

These so-called perfluorocarbons are generally copolymers of two monomers with one monomer being selected from a group including vinyl fluoride, hexafluoropropylene, vinylidene fluoride, trifluoroethylene, chlorotrifluoroethylene, perfluoro(alkylvinyl ether), tetrafluoroethylene and mixtures thereof.

The second monomer is selected from a group of monomers containing an $SO_2F$ or sulfonyl fluoride group. Examples of such second monomers can be generically represented by the formula $CF_2\!=\!CFR_1SO_2F$. $R_1$ in the generic formula is a bifunctional perfluorinated radical comprising one to eight carbon atoms. One restraint upon the generic formula is a general requirement for the presence of at least one fluorine atom on the carbon atom adjacent the $—SO_2F$, particularly where the $—SO_2F$ group exists as the $—(—SO_2NH)mQ$ form. In this form, Q can be hydrogen or an alkali or alkaline earth metal cation and m is the valence of Q. The $R_1$ generic formula portion can be of any suitable or conventional configuration, but it has been found preferably that the vinyl radical comonomer join the $R_1$ group through an ether linkage.

Typical sulfonyl fluoride containing monomers are set forth in U.S. Pat. Nos. 3,282,875; 3,041,317; 3,560,568; 3,718,627 and methods of preparation of intermediate perfluorocarbon copolymers are set forth in U.S. Pat. Nos. 3,041,317; 2,393,967; 2,559,752 and 2,593,583. These perfluorocarbons generally have pendant $SO_2F$ based functional groups.

Chlorine cells equipped with separators fabricated from perfluorocarbon copolymers have been utilized to produce a somewhat concentrated caustic product containing quite low residual salt levels. Perfluorocarbon copolymers made from perfluoro(3,6-dioxa-4-methyl-7-octenesulfonyl fluoride) comonomer have found particular acceptance in $Cl_2$ cells.

Many chlorine cells use a sodium chloride brine feedstock. One drawback to the use in such cells of perfluorocarbon separators having pendant sulfonyl fluoride based functional groups has been a relatively low resistance in desirably thin separators to back migration of caustic formed in these cells, including $OH^-$ radicals, from the cathode to the anode compartment. This back migration contributes to a lower current utilization efficiency in operating the cell since the $OH^-$ radicals react at the anode to produce oxygen. Recently, it has been found that if pendant sulfonyl fluoride based cationic exchange groups adjacent one separator surface were converted to pendant carbonyl groups, the back migration of $OH^-$ radicals in such $Cl_2$ cells would be significantly reduced. Conversion of sulfonyl fluoride groups to carboxylate groups is discussed in U.S. Pat. No. 4,151,053.

Presently, perfluorocarbon separators are generally fabricated by forming a thin membrane-like sheet under heat and pressure from one of the intermediate copolymers previously described. The ionic exchange capability of the copolymeric membrane is then activated by saponification with a suitable or conventional compound such as a strong caustic. Generally, such membranes are between 0.5 mil and 150 mil in thickness. Reinforced perfluorocarbon membranes have been fabricated, for example, as shown in U.S. Pat. No. 3,925,135.

Notwithstanding the use of such membrane separators, a remaining electrical power inefficiency in many batteries, fuel cells and electrochemical cells has been associated with a voltage drop between the cell anode and cathode attributable to passage of the electrical current through one or more electrolytes separating these electrodes remotely positioned on opposite sides of the cell separator.

Recent proposals have physically sandwiched a perfluorocarbon membrane between an anode-cathode pair. The membrane in such sandwich cell construction functions as an electrolyte between the anode-cathode pair, and the term solid polymer electrolyte (SPE) cell has come to be associated with such cells, the membrane being a solid polymer electrolyte. Typical sandwich SPE cells are described in U.S. Pat. Nos. 4,144,301; 4,057,479; 4,056,452 and 4,039,409.

At least one difficulty has surfaced in the preparation of SPE sandwiches employing reticulate electrode structures. Generally these sandwich SPE electrode assemblies have been prepared by pressing a generally rectilinear electrode into one surface of a perfluorocarbon copolymeric membrane. In some instances, a second similar electrode is simultaneously or subsequently pressed into the obverse membrane surface. To avoid heat damage to the copolymeric membrane, considerable pressure, often as high as 6000 psi is required to embed the electrode firmly in the membrane. For reasons related to reticulate electrode structural configuration, such pressure is generally required to be applied simultaneously over the entire electrode area, requiring a press of considerable proportions when preparing a commercial scale SPE electrode. As yet, the solution coating of such electrodes with perfluorocarbon copolymer has not been feasible principally due to difficulties in developing a suitable solvent for perfluorocarbon copolymer.

The use of alcohols to solvate particularly low equivalent weight perfluorocarbon copolymers is known. However, as yet, proposals for formation of at least partially solvated perfluorocarbon dispersions and for solution coating electrodes with the copolymer perfluorocarbon where the perfluorocarbon is of a relatively elevated equivalent weight desirable in, for example, chlorine cells, have not proven satisfactory. Dissatisfaction has been at least partly due to a lack of suitable techniques for dispersing and/or solvating these higher equivalent weight perfluorocarbons.

DISCLOSURE OF THE INVENTION

The present invention provides a method for forming an integral electrolytic cell membrane and solid polymer electrolyte (SPE) while cocurrently attaching an electrode. A cell membrane that is integral with a solid polymer electrolyte and carried by a cell electrode results from the method.

A device made in accordance with the instant invention includes an electrode structure suitable for use in a fuel cell, battery, electrochemical cell or the like. This electrode structure includes interstices. A portion of the electrode structure is coated with a copolymeric perfluorocarbon, the perfluorocarbon coating bridging the interstices of the electrode structure. The thickness and continuity of the copolymeric perfluorocarbon bridging the interstices should be contiguous and sufficiently thick to preclude free movement of liquids within the cell from one side of the coated electrode structure to the other. More than one coating of one or more perfluorocarbon copolymers may be applied whereby the integral membrane and SPE possess more than one desirable pendant functional group attribute of the perfluorocarbon copolymers.

A solid polymer electrolyte-electrode of the instant invention is prepared by a process begun when a selected perfluorocarbon copolymer is dispersed in an at least partially solvating dispersion media. A desired electrode structure is then at least partially coated with the dispersion, the dispersion bridging the interstices. The dispersion media is removed following coating. Repeated cycles of coating and subsequent removal of the dispersion media may be desirable in achieving an integral membrane and SPE having desired polymeric functional group properties and/or to achieve a desired thickness.

In certain preferred embodiments, the electrode structure can include surface portions comprising one or more electrocatalytic compounds. In forming solid polymer electrolyte-electrodes using such electrode structures, it is desirable that these electrocatalytically active surfaces not be coated. This is accomplished by a method such as masking the electrocatalytic surface portions prior to coating.

Where the electrode structure is coated with the dispersion to an extent providing a coating over a greater area of the surface of the electrode structure than is desired, in certain preferred embodiments, the coating covering the undesirable electrode structure surface areas can be removed.

The above and other features and advantages of the invention will become apparent from the following detailed description of the invention made with reference to the accompanying drawings which form a part of the specification.

BEST EMBODIMENT OF THE INVENTION

Figure 1:
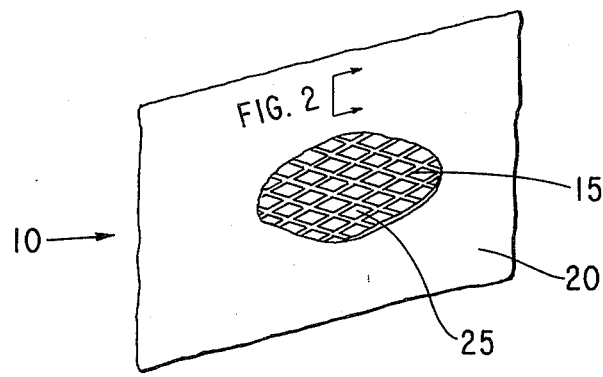
FIG. 1 is an elevational view of the solid polymer electrolyte-electrode of this invention viewed from the coated side.
Figure 2:
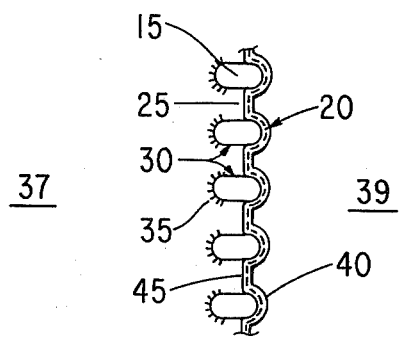
FIG. 2 is a partial side elevational cross sectional view of the solid polymer electrolyte-electrode of the instant invention.

Referring to FIGS. 1 and 2, an integral membrane and solid polymer electrolyte-electrode is shown generally at 10. The solid polymer electrolyte (SPE) electrode 10 is comprised of an electrode structure 15 and a polymer coating 20.

The electrode structure 15 is generally of reticulate form but equally may be of sintered metal or other suitable or conventional configuration. The electrode structure 15 includes interstices 25.

The polymer coating 20 coats generally one surface of the electrode structure 15 and bridges or blinds the interstices 25. All interstices to be immersed in electrolyte contained in the electrochemical cell must be entirely blinded. The thickness of the coating, particularly that coating bridging the interstices, can be varied, but generally ranges between 0.5 and 150 mils and preferably ranges between 4 and 10 mils.

Where the SPE-electrode 10 is to be used as an anode, the surface 30 remaining uncoated can include an electrocatalytic surface portion 35. This electrocatalytic portion 35 includes at least one compound selected from the group consisting of gold, silver and oxides of: iron, nickel, chromium, antimony, tin, cobalt, copper, lead, manganese, titanium, and a platinum group metal; the platinum group comprising platinum, palladium, osmium, iridium, rhodium and ruthenium.

The electrode structure 15 is made principally from a suitable or conventional substrate such as: Periodic Table Group IVA metals tin and lead; Periodic Table Group IB metals copper, silver and gold; Periodic Table Group 8 metals cobalt, nickel, iron including stainless steels, ruthenium, rhodium, palladium, osmium, iridium and platinum; as well as manganese, chromium, vanadium, titanium, niobium, zirconium, bismuth, tantalum, aluminum and carbon. Where the SPE-electrode 10 is to function as an anode, the electrocatalytic compound is applied to the anode in any well-known manner.

The SPE electrode 10 can be employed in an electrolytic cell such as a sodium chloride brine based chlorine generation cell. Where the electrode structure 15 is to function as an anode, it advantageously includes the electrocatalytic surface portion 35. Sodium chloride brine present in the cell generally at 37 reacts at the anode to release $Cl_2$ and $Na^+$ cations. The $Na^+$ cations negotiate the membrane-SPE 20 carrying current between cell anode and cathode and are thereafter available for reaction at a cell cathode of suitable or conventional configuration. Alternately, the reticulate electrode structure can perform as a cathode whereby sodium ions negotiating the coating 20 react to form caustic NaOH with hydroxyl ions liberated by the cathodic dissociation of water.

The SPE electrode 10 of the instant invention is prepared by at least partially coating the reticulate electrode structure within a dispersion of perfluorocarbon copolymer having pendant functional groups capable of being converted to ion exchange functional group such as groups based upon or derived from sulfonyl, carbonyl, or in some cases phosphoric functional groups. The coating can be accomplished in any suitable or conventional manner such as by dipping, spraying, brushing or with a roller. Following coating, the dispersing media for the perfluorocarbon copolymer is removed, usually by the application of gentle heat and, if desired, vacuum, or by leaching with a suitable or conventional light solvent such as acetone, 2-propanol or a halogenated hydrocarbon such as FREON® 113, a product of duPont. One or more coatings may be required to provide a coating of desired thickness and one that effectively blinds all the interstices of the electrode structure 15.

The copolymeric perfluorocarbon dispersed for use in coating the electrode structure is generally an intermediate copolymer having functional groups providing latent ion exchange capability later activated or an ion exchange activated copolymer. The intermediate polymer is prepared from at least two monomers that include fluorine substituted sites. At least one of the monomers comes from a group that comprises vinyl fluoride, hexafluoropropylene, vinylidene fluoride, trifluoroethylene, chlorotrifluoroethylene, perfluoro(alkyl vinyl ether), tetrafluoroethylene and mixtures thereof.

At least one of the monomers comes from a grouping having members with functional groups capable of imparting cationic exchange characteristics to the final copolymer. Monomers containing pendant sulfonic acid, carboxylic acid or, in some cases phosphoric acid functional groups are typical examples. Condensation esters, amides or salts based upon the same functional groups can also be utilized. Additionally, these second group monomers can include a functional group into which an ion exchange group can be readily introduced and would thereby include oxyacids, salts, or condensation esters of carbon, nitrogen, silicon, phosphorus, sulfur, chlorine, arsenic, selenium, or tellurium.

Among the preferred families of monomers in the second grouping are sulfonyl containing monomers containing the precursor functional group $SO_2F$ or $SO_3$ alkyl. Examples of members of such a family can be represented by the generic formulae of $CF_2=CFSO_2F$ and $CF_2=CFR_1SO_2F$ where $R_1$ is a bifunctional perfluorinated radical comprising 2 to 8 carbon atoms.

The particular chemical content or structure of the perfluorinated radical linking the sulfonyl group to the copolymer chain is not critical and may have fluorine, chlorine or hydrogen atoms attached to the carbon atom to which the sulfonyl group is attached, although the carbon atom to which the sulfonyl group is attached must also have at least one fluorine atom attached. If the sulfonyl group is attached directly to the chain, the carbon in the chain to which it is attached must have a fluorine atom attached to it. The $R_1$ radical of the formula above can be either branched or unbranched, i.e., straight chained, and can have one or more ether linkages. It is preferred that the vinyl radical in this group of sulfonyl fluoride containing comonomers be joined to the $R_1$ group through an ether linkage, i.e., that the comonomer by of the formula $CF_2=CFOR_1SO_2F$. Illustrative of such sulfonyl fluoride containing comonomers are:

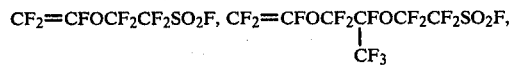

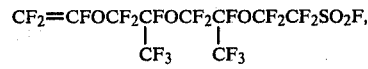

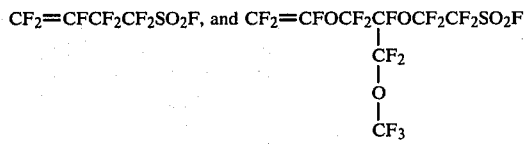

The corresponding estes of the aforementioned sulfonyl fluorides are equally preferred.

While the preferred intermediate copolymers are perfluorocarbon, that is perfluorinated, others can be utilized where there is a fluorine atom attached to the carbon atom to which the sulfonyl group is attached. A highly preferred copolymer is one of tetrafluoroethylene and perfluoro(3,6-dioxa-4-methyl-7-octenesulfonyl fluoride) comprising between 10 and 60 weight percent, and preferably between 25 and 40 weight percent, of the latter monomers.

These perfluorinated copolymers may be prepared in any of a number of well-known manners such as is shown and described in U.S. Pat. Nos. 3,041,317; 2,393,967; 2,559,752 and 2,593,583.

An intermediate copolymer is readily transformed into a copolymer containing ion exchange sites by conversion of the sulfonyl groups ($-SO_2F$ or $-SO_3$ alkyl) to the form $-SO_3X$ by saponification or the like wherein X is hydrogen, an alkali metal, or an alkaline earth metal. The converted copolymer contains sulfonyl fluoride based ion exchange sites contained in side chains of the copolymer and attached to carbon atoms having at least one attached fluorine atom. Not all sulfonyl groups within the intermediate copolymer need be converted. The conversion may be accomplished in any suitable or customary manner such as is shown in U.S. Pat. Nos. 3,770,547 and 3,784,399.

A coating 20 made from copolymeric perfluorocarbon having sulfonyl based cation exchange functional groups possesses a relatively low resistance to back migration of sodium hydroxide from cathodic areas of the cell 39 to the anodic cell areas 37, although such a membrane successfully resists back migration of other caustic compounds such as KOH. Where the sulfonyl fluoride group is at least partially converted to a sulfonamide by treating with propylamine or the like, usefulness in a chlorine cell based upon NaCl electrolysis may be improved.

In some preferred modes for carrying out the invention, the coating includes pendant carbonyl based functional groups. The pendant carbonyl based groups provide the copolymeric perfluorocarbon with significantly greater resistance to the migration of sodium hydroxide, but can also substantially reduce the rate of migration of sodium ions from the anode to the cathode.

Copolymeric perfluorocarbon having pendant carbonyl based cationic exchange functional groups can be prepared in any suitable or conventional manner such as in accordance with U.S. Pat. No. 4,151,053 or Japanese patent application No. 52(1977)38486 or polymerized from a carbonyl functional group containing monomer derived from a sulfonyl group containing monomer by a method such as is shown in U.S. Pat. No. 4,151,053. Preferred carbonyl containing monomers include $CF_2=CF-O-CF_2(CF_3)O(CF_2)_2COOCH_3$ and $CF_2=CF-O-CF_2CF(CF_3)OCF_2COOCH_3$.

Preferred copolymeric perfluorocarbons utilized in the instant invention therefore include carbonyl and/or sulfonyl based groups represented by the formula —$OCF_2CF_2X$ and/or —$OCF_2CF_2Y$—B—$YCF_2CF_2O$— wherein X is sulfonyl fluoride ($SO_2F$) carbonyl fluoride ($CO_2F$) sulfonate methyl ester ($SOOCH_3$) carboxylate methyl ester ($COOCH_3$) ionic carboxylate ($COO^-Z^+$) or ionic sulfonate ($SO_3^-Z^+$), Y is sulfonyl or carbonyl (—SO— —CO—), and B is a cross-linking structure such as —O—, —O—O—, —S—S—, and di and poly amines of the form $NH(CR_1R_2)_xNH_2$ where $R_1$, $R_2$ are selected from short chain alkanes, alkenes, hydrogen, and amine groups and Z is hydrogen, an alkali metal such as lithium, cesium, rubidium, potassium and sodium or an alkaline earth such as barium, beryllium, magnesium, calcium, strontium and radium or a quaternary ammonium ion. B forms of other than —O— display relatively low cation exchange functionality, however.

Generally, sulfonyl, carbonyl, sulfonate and carboxylate esters and sulfonyl and carbonyl based amide forms of the perfluorocarbon copolymer are readily converted to a salt form by treatment with a strong alkali such as NaOH.

The equivalent weight range of the copolymer intermediate used in preparing the membrane 15 is important. Where lower equivalent weight copolymers are utilized, the membrane can be subject to destructive attack such as dissolution in cell chemistry. When an excessively elevated equivalent weight copolymer is utilized, the membrane may not pass cations sufficiently readily resulting in an unacceptably low electrical efficiency in operating the cell. It has been found that copolymer intermediate equivalent weights should preferably range between about 1000 and 1500 for the sulfonyl based membrane materials and between about 900 and 1500 for the carbonyl based membrane materials.

The electrocatalytic anode substance can be applied as a component of one or more coatings to an electrode structure. When applied to an electrode structure, the electrocatalytic compound can be applied directly over an electrode substrate, generally a valve metal such as titanium or the like well known in the art, or it may be applied over a primary coating first applied to the substrate of types also well known in the art. The electrocatalytic coating is generally applied to electrode structure portions not intended to be coated by the copolymeric perfluorocarbon. Coverage of the electrode with the electrocatalytic substance is usually constrained to surfaces not coated with the copolymer to avoid a separation of the coating from the electrode structure 15 that would accompany generation of chlorine gas at copolymer coated electrode structure surfaces. For the same reasons, it is necessary to season or render inactive those portions of the electrode substrate structure 15 to be coated by the copolymer. Seasoning avoids generation of chlorine gas beneath the coating adjacent the electrode structure 15 that would cause a separation of the coating. Desired portions of the electrode structure 15 can be rendered inactive by the brief actual generation of chlorine using the electrode structure before copolymer coating.

Perfluorocarbon copolymer is dispersed in any suitable or conventional manner. Preferably relatively finely divided particles of the copolymer are used to form the dispersion. The particles are dispersed in a dispersion media that preferably has significant capability for solvating the perfluorocarbon copolymer particles. A variety of solvating dispersers have been discovered for use with the perfluorocarbon copolymers; these suitable solvating dispersers are tabulated in Table I and coordinated with the copolymer pendant functional groups with which they have been found to be an effective dispersion medium. Since one or more of the dispersers may be used together in preparing a perfluorocarbon dispersion, as well as one or more of the dispersers suitably diluted, the term dispersion media is used to refer to a suitable or conventional solvating dispersion agent having at least one solvating dispersion medium.

TABLE I

SOLVENT CROSS REFERENCE TO PERFLUOROCARBON COPOLYMER CONTAINING VARIOUS PENDANT FUNCTIONAL GROUPS

| SOLVENT | FUNCTIONAL GROUP | | | |
|---|---|---|---|---|
| | $SO_2F$ | $COO^-Z^+$ | COO (ester) | $SO_3^-Z^+$ |
| Halocarbon Oil | X | | X | |
| perfluorooctanoic acid | X | | X | |
| perfluorodecanoic acid | X | | X | |
| perfluorotributylamine | X | | | |
| FC-70 available from 3M (perfluorotrialkylamine) | X | | | |
| perfluoro-1-methyldecalin | X | | | |
| decafluorobiphenyl | X | | | |
| pentafluorophenol | X | | | |
| pentafluorobenzoic acid | X | | | |
| N—butylacetamide | | X | | X |
| tetrahydrothiophene-1,1-dioxide (tetramethylene sulfone, Sulfolane ®) | | | | X |
| N,N—dimethyl acetamide | | | | X |
| N,N—diethyl acetamide | | | | X |
| N,N—dimethyl propionamide | | | | X |
| N,N—dibutylformamide | | | | X |
| N,N—dipropylacetamide | | | | X |
| N,N—dimethyl formamide | | | | X |
| 1-methyl-2-pyrrolidinone | | | | X |
| diethylene glycol | | | | X |
| ethylacetamidoacetate | | | | X |

Z is any alkali or alkaline earth metal or a quaternary ammonium ion having attached hydrogen, alkyl, substituted alkyl, aromatic, or cyclic hydrocarbon.
Halocarbon Oil is a commercially marketed oligomer of chlorotrifluoroethylene.

Certain of the solvating dispersion media function more effectively with perfluorocarbon copolymer having particular metal ions associated with the functional group. For example, N-butylacetamide functions well with the groups COOLi and $SO_3Ca$. Sulfolane and N,N-dipropylacetamide function well with $SO_3Na$ functionality.

It is believed that other suitable or conventional perhalogenated compounds like perfluorotrialkyl amines can be used for at least partially solvating the $SO_2F$ or carboxylate ester forms of perfluorocarbon copolymer. It is believed that other suitable or conventional strongly polar compounds can be used for solvating the ionic sulfonate and carboxylate forms of the perfluorocarbon copolymer.

In at least partially solvating the perfluorocarbon polymers, it is frequently found necessary to heat a blend of the dispersion media and the relatively finely divided perfluorocarbon to a temperature between about 50° C. and 250° C. but not in excess of the boiling point for the resulting dispersion. Depending upon the solvating dispersion medium, a solution of between about 5 and 25 weight percent results. It is not necessary that the perfluorocarbon be dissolved completely in order to form a suitable electrode coating. It is important that perfluorocarbon particles remaining unsolvated be relatively small to produce a smooth void free coating particularly in bridging the interstices. In one alternate technique, the dispersion is heated to at least approach complete solvation and then cooled to form a gel having particles of approximately the size desired to form the coating. The particle size is controllable using either of mechanical or ultrasonic disruption of the gelatinous dispersion.

Referring to Table I, it may be seen that various solvents have a particularly favorable effect upon only perfluorocarbon copolymers having certain functional groups. An SPE coated electrode 10 containing perfluorocarbon having functional groups of a first type can be at least partially solvent welded to a perfluorocarbon coated electrode having functional groups of a second type; however, conversion of one or both types of functional groups may be necessary to achieve solvent compatability. Particularly, hydrolysis and substitution of metal ions ionically bonded to the functional group can provide a relatively simple tool for coordinating functional groups and solvents. However, other methods such as the use of $SF_4$ to reform sulfonyl fluoride functional groups from derivatives of sulfonyl fluoride are also available.

One simple method for constraining dispersion from coating electrocatalytic portions 35 of the electrode structure 15 is to mask those electrocatalytic portions 35 while coating the electrode structure 15 with the dispersion. A reticulate electrode can be effectively masked by pressing the electrode structure into a sheet of aluminum foil covering a sheet of a resinous material that relatively readily undergoes cold flow. Cold flow is the relatively slow flowing of a material away from an object being pressed into the material.

Particularly, an E. I. duPont product, TEFLON®, in the form of fluoroethylene polymer (FEP) or polytetrafluoroethylene (PTFE) has been found to be particularly useful for use as the resinous sheet. As the electrode structure is pressed into the aluminum foil, the TEFLON supporting the foil cold flows from beneath the electrode structure towards the interstices of the electrode structure. The foil is urged by the cold flowing TEFLON to conform closely to contours of the electrode structure including portions of the electrode structure surrounding the interstices. Where the surface of the electrode structure pressed into the foil includes electrocatalytic portions, the electrocatalytic portion can thereby be effectively masked.

Where an entire electrode structure has been immersed in dispersed copolymer and thereby coated, it is desirable to expose some portion of the electrode structure. Selective removal of the coating can be accomplished by any suitable or conventional method such as grinding, scarifying, cutting or the like.

Where desired, ion exchange functional groups adjacent one coating surface can be converted from, for example, sulfonyl based groups to carboxylate based groups. Conversion, such as by methods shown in U.S. Pat. No. 4,151,053 can provide a carboxylate based layer 40 in the coating that assists in resisting sodium hydroxide backmigration from the cell cathode to the cell anode while retaining a desirable sulfonyl based layer 45 more freely permeable to sodium ions seeking to migrate to the cell cathode.

In a preferred alternate, one or more coatings of a perfluorocarbon copolymer containing a particular functional group is applied to the electrode 15 followed by one or more coatings of perfluorocarbon copolymer contaning a second functional group. Where the copolymers are mutually soluble in dispersing media used for dispersing the second perfluorocarbon copolymer, a solvent bond between the coating applications is established by which they become coadhered.

In one typical example, perfluorocarbon containing pendant sulfonyl fluoride groups is applied to unmeshed portions of an electrode to be used as an anode. The sulfonyl fluoride group containing copolymer is dispersed in Halocarbon Oil, perfluorodecanoic acid or perfluorooctanoic acid.

After establishing a contiguous coating of desired thickness, a further coating of a second perfluorocarbon copolymer containing pendant methyl carboxylate ester groups is applied over the original coating again using Halocarbon Oil, perfluorooctanoic acid or perfluorodecanoic acid as the dispersion media.

Functional groups in both copolymers are then saponified using KOH to yield an intergral SPE and membrane having sulfonyl based cationic exchange groups opposing the anode, and carbonyl based functional groups opposing a cathode utilized in conjunction with the anode in a cell.

Further, a cathode coated on one surface with a functional copolymeric fluorocarbon containing pendant first functional groups can be solvent adhered to an anode having a perfluorocarbon coating containing pendant second functional groups, or each can be solvent to an intervening perfluorocarbon copolymeric film. Heat and/or pressure may be necessary to assure acceptable coadherence using solvents, but under extremes, of temperature and pressure, such as 2000–6000 psig and temperatures in excess of 100° C.+ a solvent may be unnecessary for coadherence.

The following examples are offered to illustrate further the invention.

EXAMPLE 1

Perfluorocarbon copolymer having pendant $SO_2F$ functional groups and polymerized from polytetrafluoroethylene and perfluoro(3,6-dioxa-4-methyl-7-octenesulfonylfluoride) and having an equivalent weight of about 1100 was dissolved in hot (240° C.) Halocarbon Oil to yield a 12 percent (weight) solution-dispersion. A titanium expanded mesh, 10 Ti 14-3/0 (read as titanium mesh having a wire thickness of 10 mils, a wire width of 14 mils, a mesh opening having a long dimension of about ⅛ inch and a short dimension of about 50 mils) is coated on one side with an electrocatalytic coating such as is described and shown in U.S. Pat. No. 3,751,296. A sheet of aluminum foil was sandwiched between the electrocatalytic surface and a sheet of TEFLON and the electrode pressed into the foil and TEFLON.

The mesh was then mounted upon a frame and immersed in the dispersion, withdrawn and the Halocarbon Oil removed by extraction using FREON 113. Immersion and extraction were repeated. The mesh was demounted from the frame and hydrolyzed in weak KOH for 96 hours at room temperature which served also to leach the aluminum foil from the mesh. A 4 mil contiguous cationic exchange coating resulted on the mesh.

EXAMPLE II

A procedure identical to that of Example I was performed using a sheet of porous titanium, made by sintering titanium particles coated with an electrocatalytic coating as in Example 1. A contiguous 4 mil coating resulted upon the sheet.

EXAMPLE III

A titanium mesh 5 Ti 7-3/0 electrocatalytically coated as in Example I and a nickel mesh 5 Ni 7-3/0 were each masked on one side using aluminum foil and TEFLON under pressure in accordance with Example I. The meshes were installed in a frame and coated in accordance with Example I. After removal of the disperson media, the coated surfaces were than aligned with a perfluorocarbon film between them and pressed at 180° C. and 2000 psig until each coadhered to the film. The resulting composite film was a 23 mil thickness including both electrodes.

The laminated electrode structure was saponified in weak KOH.

EXAMPLE IV

Sulfonyl fluoride functional groups in the coatings of Examples I, II and III are converted in part by n-propyl amine to sulfonamide functionality before saponification. The resulting coating provides superior chlorine cell performance to coatings including only saponified sulfonyl fluoride functional groups.

While a preferred embodiment of the invention has been described in detail, it will be apparent that various modifications or alterations may be made therein without departing from the scope of the invention as set forth in the appended claims.

What is claimed is:

1. A method for forming an electrolyte electrode assembly for use in an electrochemical cell comprising the steps of:
   (1) dispersing a quantity of a copolymeric perfluorocarbon having an equivalent weight greater than 900 but less than about 1500 and having one of sulfonyl, carbonyl and phosphorous based pendant functional groups in a solvating dispersion media;
   (2) providing an electrode structure that includes interstices;
   (3) at least once applying the dispersion to the electrode structure, whereby the dispersion at least partially coats the electrode structure bridging the interstices; and
   (4) removing the dispersion media.

2. The method of claim 1 including the additional step of applying at least one additional coating of a further copolymeric perfluorocarbon compound in an equivalent weight range of from 900 to about 1500 and having a second pendant functional group.

3. The method of claim 1 including the step of masking portions of the electrode structure prior to immersion in the dispersion.

4. The method of claim 1 including the step of removing coating from a portion of the electrode structure after completion of coating and dispersion media removal.

5. A method for making an electrode assembly for use in an electrochemical cell comprising the steps of:
   (1) dispersing a quantity of a copolymeric perfluorocarbon having an equivalent weight greater than 900 but less than about 1500 and having one sulfonyl, carbonyl and and phosphorous based pendant functional groups in a solvating dispersion media;
   (2) providing a reticulate electrode structure;
   (3) at least once coating the reticulate electrode with the dispersion and removing the dispersion media until a coating of a desired thickness has been attained on the reticulate electrode structure, and interstices between elements of the reticulate electrode structure have been bridged; and
   (4) removing a portion of the coating to expose a portion of the reticulate electrode structure.

6. The method of claim 5 wherein masking comprises the steps of:
   (1) placing a sheet of a relatively thin masking material over a sheet of a resinous material capable of relatively readily undergoing cold flow;
   (2) placing the reticulate electrode structure upon the masking material sheet with the electrocatalytic surface portions opposing the sheet;
   (3) pressing the reticulate electrode structure into the masking material sheet until the resinous material undergoes cold flow, thereby supporting the masking material sheet in conforming to contours of the reticulate electrode electrocatalytic surface portion.

7. The method of claim 5 including the additional step of applying at least one coating of a further perfluorocarbon copolymeric compound having an equivalent weight greater than 900 but less than about 1500 and having a second pendant functional group.

8. A method for making a perfluorocarbon copolymeric membrane and solid polymer electrolyte electrode assembly for use in an electrochemical cell comprising the steps of:
   (1) dispersing a quantity of copolymeric perfluorocarbon having an equivalent weight of greater than 900 but less than about 1500 and having one of sulfonyl, carbonyl phosphorous based pendant functional groups in a solvating dispersion media;
   (2) providing a reticulate electrode structure including a surface portion comprising at least one electrocatalytic compound;
   (3) masking the electrocatalytic surface portion;
   (4) at least once coating the reticulate electrode structure with the dispersion media whereby the dispersion bridges interstices between the elements of the reticulate electrode structure;
   (5) removing the dispersion media;
   (6) repeating steps 4 and 5 until a coating of desired thickness is achieved upon the reticulate electrode structure completely bridging the interstices; and
   (7) removing the masking.

9. The method of claim 8 wherein the reticulate electrode structure comprises nickel.

10. The method of claim 8 including the additional step of applying at least one coating of a further copolymeric perfluorocarbon compound having an equivalent weight greater than 900 but less than about 1500 and having a second pendant functional group.

11. A method for making a perfluorocarbon copolymeric membrane having an equivalent weight of greater than 900 but less that about 1500 and solid polymer electrolyte electrode assembly for use in an electrochemical cell comprising the steps of:

(1) dispersing a quantity of the copolymeric perfluorocarbon in solvating dispersion media;

(2) providing a reticulate electrode structure including a surface portion comprising at least one electrocatalytic compound;

(3) placing a sheet of resinous material beneath a sheet of aluminum foil;

(4) placing the reticulate electrode structure upon the aluminum foil with the electrocatalytic surface portion opposing the aluminum foil;

(5) pressing the reticulate electrode structure into the aluminum foil, the resinous material undergoing cold flow whereby the aluminum foil generally conforms to contours of the reticulate electrode structure;

(6) at least once coating the reticulate electrode structure with the dispersion and removing the dispersion media until a coating of a desired thickness has been built upon the electrode bridging between the elements of the reticulate electrode structure; and (7) removing the aluminum foil and resinous material.

12. The method of either of claims 5 and 11 wherein the electrocatalytic compound comprises at least one compound selected from a group consisting of oxides of manganese, tin, antimony, titanium, vanadium and a platinum group metal.

13. The method of any of claims 1 through 11 wherein the perfluorocarbon copolymer is polymerized from at least two monomers, one such monomer consisting essentially of at least one fluorinated vinyl compound and said other monomer consisting essentially of at least one monomer having the structure

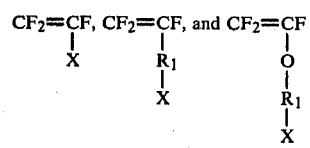

wherein $R_1$ is a bifunctional perfluorinated radical containing from 2 to 8 carbon atoms which carbon atoms can be at least once interrupted by one or more oxygen atoms and X is selected from a group consisting of sulfonyl fluoride, carboxyl fluoride, sulfonate ester, carboxylate ester, and saponification products of sulfonyl fluoride and carboxyl fluoride.

14. The method of any of claims 1 through 11 wherein the dispersion media is selected from a group of chlorotrifluoroethylene; perfluorooctanoic acid; perfluorodecanoic acid; perfluorotributylamine; perfluoro-1-methyldecalin; decafluorobiphenol; pentafluorophenol; pentafluorobenzoic acid; N-butylacetamide; tetrahydrothiophene-1,1-dioxide (tetramethylene sulfone); N-N-diethylacetamide; N-N-dimethylpropionamide; N,N-dibutylformamide; N,N-dimethylacetetamide; perfluorotrialkylamine; and dipropylamide.

15. The method of any of claims 1, 5, 8 and 11 including the additional step of adhering coated portions of a second electrode assembly to the electrode assembly using at least one of heat, pressure and solvent.

16. A method for forming a perfluorocarbon copolymer coated structure comprising the steps of:

(1) dispersing a quantity of a copolymeric perfluorocarbon having an equivalent weight greater than 900 but less than about 1500 and having one of sulfonyl, carbonyl and phosphorous based pendant functional groups in a solvating dispersion media;

(2) providing a substrate structure that includes interstices;

(3) at least once applying the dispersion to the substrate structure, whereby the dispersion at least partially coats the substrate structure bridging the interstices; and (4) removing the dispersion media.

* * * * *